No. 760,554. PATENTED MAY 24, 1904.
M. ONDA.
MANUFACTURE OF SULFID OF ALUMINIUM AND ALLOYS OF ALUMINIUM.
APPLICATION FILED OCT. 14, 1903.
NO MODEL.

Witnesses:
H. S. Noble
L. Waldman

Inventor,
Miyagoro Onda
by J. J. Singer
Att'y.

No. 760,554. Patented May 24, 1904.

UNITED STATES PATENT OFFICE.

MIYAGORO ONDA, OF NAGOYA, JAPAN.

MANUFACTURE OF SULFID OF ALUMINIUM AND ALLOYS OF ALUMINIUM.

SPECIFICATION forming part of Letters Patent No. 760,554, dated May 24, 1904.

Application filed October 14, 1903. Serial No. 177,059. (No specimens.)

*To all whom it may concern:*

Be it known that I, MIYAGORO ONDA, a subject of the Emperor of Japan, residing at No. 18 Yaoya street, Nagoya, in the Province of Owari, Japan, have invented a certain new and useful Process in the Manufacture of Sulfid of Aluminium Simultaneously with an Alloy of Aluminium and other Metal or Metals, of which the following is a specification.

The object of the invention is to manufacture in a simple and less costly process than that now in vogue of sulfid of aluminium and in addition to that an alloy of aluminium and other metal or metals in one and the same operation, the process being described as follows, in connection with the accompanying drawings, in which—

Figure 1:
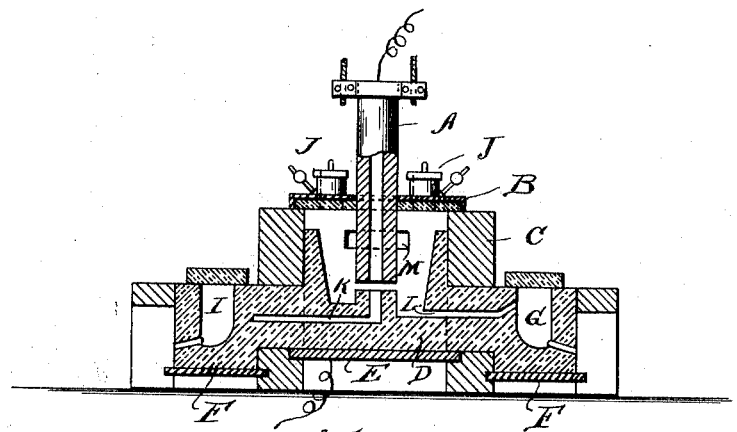
Figure 2:
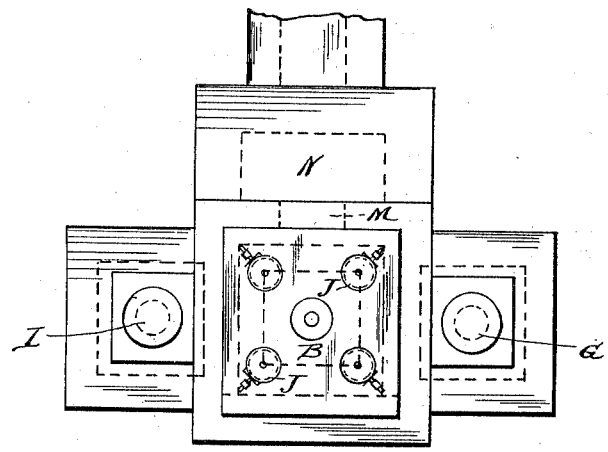

Figure 1 is a vertical section, partly in elevation, of an electric furnace adapted to be used in carrying out the present process. Fig. 2 is a plan view of the same with the carbon-rod removed.

A represents a hollow carbon-rod connected at the top by means of a clamp with one terminal of an electric conductor from a suitable source of electricity. This rod is adapted to be raised or lowered by any suitable means. (Not shown.)

The furnace is provided with an iron covering B, which is lined with fire-brick and provided with four hoppers J, each having a lid at the top and a swinging door below. A hole through the center of the covering B admits the carbon-rod A. The walls C of the furnace are also made of fire-brick, and the furnace is provided with a bed of carbon D. An iron bed-plate E forms the opposite terminal for the electric circuit. Iron bed-plates F are provided for the crucibles, one of which, G, is adapted to receive the melted aluminium alloy which is collected therein and is drawn out therefrom. I is another crucible in which the aluminium sulfid is collected and tapped out from.

K represents a canal through which the aluminium sulfid passes from the furnace proper to the crucible I, while L represents a canal through which the aluminium alloy passes from the furnace proper to the crucible G.

An opening M is provided in the side of the furnace for expelling the gases and silicon sulfid from the furnace to a dust-chamber N.

First. Oxid of aluminium or ores containing it are well mixed with charcoal, coke, or other carbonaceous matters and also either a metallic sulfid or metallic sulfate whose heat of formation is lower than that of corresponding aluminium salts. The mixture thus formed is charged into a furnace, and the contents of the furnace are subjected to a high temperature, preferably about 2,000° centigrade, either by means of electricity or ordinary caloric agency, such as heat generated by hydrogen or acetylene gas burners or the like, used for externally heating the charge in a retort made of refractory materials, as magnesia, with graphite lining. The aluminium is converted into the sulfid. The other metal or metals are desulfurized and absorb a certain quantity of the aluminium which is not sulfurized, producing an aluminium alloy, while the carbon is driven away as carbon monoxid.

The different constituents of the contents of the furnace are to bear the following proportion, taking oxid of aluminium as standard of determining the relative quantity of the other constituents.

(*a*) Carbonaceous matters—*i. e.*, charcoal, coke, &c. The carbonaceous matters are required for removing all the oxygen reducible by carbon contained in the mixture in the furnace, and theoretically the quantity of the matters to be added is to correspond to about seventy-five per cent. of the weight of oxygen. Of course some allowance should be made against the waste of carbon consumed by the air present in the furnace.

(*b*) Metallic sulfid or sulfate. The quantity of metallic sulfid or sulfate to be added is determined as follows: As ninety-six parts of sulfur are required for every fifty-four parts of aluminium to convert it into sulfid, the quantity of sulfur to be added must be sufficient for sulfurizing the quantity of aluminium present in the ores, less the quantity of the aluminium entering into the alloy and, in case silica is present in the ores, also the quantity sufficient for converting the silicon into sulfid. The quantity of sulfur thus calculated both for aluminium and silicon is to be recalculated, according to the usual formula of chemical composition, into the metallic sulfid or sulfate to be used in the furnace. The proper quantity of the sulfid or sulfate determined as above described is to be mixed with the ores.

A specific example illustrating my improved processes is as follows: For the aluminium ore suppose, for an example, that Arkansas bauxite is used of the composition mentioned in item 20, page 43, of *Richard's Aluminum*, Baird & Co., Philadelphia, 1896—that is, aluminia, 46.44; ferric oxid, 22.15; silica, 4.89; water, 26.68—and for the carbonaceous matters charcoal and coal-tar is used, while the metallic sulfid or sulfate is represented by iron sulfid. Assuming that the operation is directed to produce aluminium sulfid simultaneously with aluminium-iron alloy containing, say, ten per cent. aluminium in the furnace, as shown in the accompanying drawings, the foregoing ingredients are taken as follows:

|  | Weight. |
|---|---|
| Bauxite (water excluded) | 100 |
| Charcoal | 40 |
| Iron sulfid | 127.5 |

These ingredients are crushed together by a ball-mill or other suitable appliances into powder, so as to bring them into intimate mixture. This requires great care, as the success of all the succeeding operations depends very much on the intimacy of the mixture. Then the mixture is put under pressure and made into balls. Before subjecting the mixture to pressure coal-tar—say about five parts in weight—is added to it in order to increase its compactness, though this addition of coal-tar is not absolutely necessary. The balls are then baked in a retort or the like. They are next broken in pieces—say of the size of an ordinary bean—ready to be charged in the furnace. The charge is introduced into the furnace through hoppers J, and an electric current of twenty to forty amperes of fifty to one hundred volts per square inch of cross-section of carbon-rod A is passed through the furnace. The arc is lighted and produces the required temperature. The iron oxid in the charge is first reduced by carbon into metal, the carbon being converted at the same time into monoxid gas. Then as the charge reaches the proper temperature the following reactions take place:

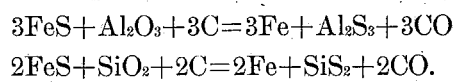

$$3FeS + Al_2O_3 + 3C = 3Fe + Al_2S_3 + 3CO$$

$$2FeS + SiO_2 + 2C = 2Fe + SiS_2 + 2CO.$$

The silicon sulfid volatilizes and escapes to the flue with the carbon monoxid. The iron in the above two reactions being liberated in nascent state under high temperature greatly promotes the reduction to metallic state by carbon of the aluminia remaining behind, thereby forming rich aluminium-iron alloy. This is an important merit of the present application. The iron derived from iron oxid in the charge also enters the aluminium-iron alloy. The aluminium sulfid and aluminium-iron alloy thus produced collect, respectively, in I and G crucibles. The charge being supplied through hoppers J as it sinks in the furnace, the operation can be carried on continuously. As in the 127.5 parts of iron sulfid (FeS) used in the charge 46.4 parts consist of sulfur, of which 7.1 parts are taken away to form silicon sulfid, (SiS$_2$,) the remaining sulfur combines with 22.1 parts aluminium to form aluminium sulfid, (Al$_2$S$_3$,) producing 61.4 parts of aluminium sulfid. The iron in the charge combines with the rest of aluminium in the ore and forms 113.6 of aluminium-iron alloy. The foregoing calculation about the products represents the maximum result obtainable.

My invention possesses the following advantages: First, presence of oxid of iron or other metallic oxids in the ores offers no injury in my process, as a sulfid or sulfate to be added as sulfurizing agent in the operation is chosen such sulfid or sulfate of metals as are same to the metals in the aluminium ores or as are fit to form useful alloys with those metals; second, the trouble incidental to the presence of silica in the aluminium ores is removed to a great extent, as it can be easily separated from the ores as sulfid of silicon and volatilized by high temperature of the furnace; third, the danger of a metallic sulfid or sulfate mixed with the aluminium ores remaining behind is minimized, as said metallic sulfid or sulfate is necessarily insufficient to sulfurize the whole quantity of aluminium in the ores; fourth, the chemical reaction is easily promoted, as the different components of the mixture are thoroughly mixed and brought in intimate contact with each other before said mixture is charged into the furnace; fifth, as a result of thorough and intimate mixing of the compound before charging it into furnace the reaction in the furnace is regular, steady, and complete; sixth, the reaction in the furnace being regular, steady, and complete in spite of high temperature required the waste of heat is minimized, just as in the cases of the manufacture of calcium carbid; seventh, the reaction in the furnace can be completed in a comparatively short time, and hence my process is excellently adapted for employing an electric furnace which can easily generate high temperature; eighth, as a metal which is to absorb the aluminium to produce an alloy with it is at the time of reaction only desulfurized and converted into metallic state in a nascent state it promotes the deoxidation of the oxid of aluminium brought in contact with it, resulting in the formation of a rich aluminium alloy; ninth, the sulfurizing agent used in my process is cheaper than carbon sulfid heretofore used for the purpose, while the metal contained in that sulfurizing agent is converted into an alloy of high commercial value; tenth, as in my process sulfid of aluminium, together with an aluminium alloy, is simultaneously produced the total value obtained by my process is of course greater than in the case of producing sulfid of aluminium alone, thus considerably reducing the cost of production per unit of product obtained.

Having thus described the nature of my invention, what I claim, and desire to secure by Letters Patent, is—

The process of manufacturing sulfid of aluminium together with an alloy of aluminium and other metal or metals contained in the metallic sulfid used in the process, in one operation, which consists in subjecting a compound consisting of oxid of aluminium or other ores containing it, together with carbonaceous materials and a metallic sulfid to a high temperature in a suitable furnace.

In testimony whereof I affix my signature in presence of two witnesses.

MIYAGORO ONDA.

Witnesses:
MINAJI SEKI,
VISAKU SUYUKI.